United States Patent [19]

Weir

[11] 4,085,731
[45] Apr. 25, 1978

[54] SOLAR ENERGY CONVERSION SYSTEM

[76] Inventor: Richard Lloyd Weir, 75 Sinclair Ave., Dayton, Ohio 45405

[21] Appl. No.: 665,504

[22] Filed: Mar. 10, 1976

[51] Int. Cl.² .................................................. F24J 3/02
[52] U.S. Cl. ..................................... 126/271; 126/270
[58] Field of Search .................. 126/270, 271; 60/641; 350/167

[56] References Cited

U.S. PATENT DOCUMENTS

| | | | |
|---|---|---|---|
| 1,683,266 | 9/1928 | Shipman | 126/271 |
| 2,303,113 | 11/1942 | Eckel | 350/167 |
| 2,907,318 | 10/1959 | Awot | 126/271 |
| 2,969,637 | 1/1961 | Rowekamp | 60/641 |
| 3,203,167 | 8/1965 | Green | 60/641 |
| 3,241,429 | 3/1966 | Rice et al. | 350/167 |
| 3,902,474 | 9/1975 | Pyle | 126/271 |
| 3,906,928 | 9/1975 | Wright | 126/271 |
| 3,910,490 | 10/1975 | Saypalia | 126/271 |
| 3,934,573 | 1/1976 | Dandini | 126/270 |

FOREIGN PATENT DOCUMENTS 456,406  6/1913  France .................. 60/641

Primary Examiner—Carroll B. Dority, Jr.

[57] ABSTRACT

A solar energy conversion system that provides for complete utilization of the solar energy impinging on solar collectors by having cylindrical lens type collection panels. This system can be used with separate heat sinks with fluid retained at different temperature levels activated to provide domestic water heating, hydronic building heating, and power generation by utilization of temperature differentials in the heat sumps and the generation of hot air pressure and flow within the panels, accomplished by special application of intermittent flow of both fluid and gas through the panel system.

3 Claims, 14 Drawing Figures

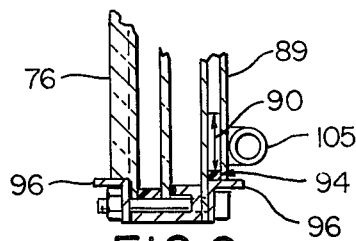
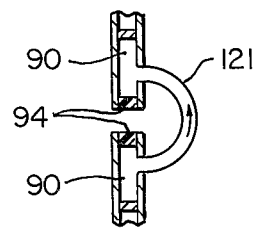
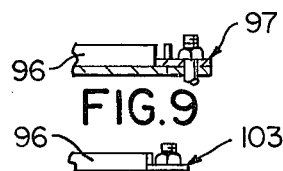
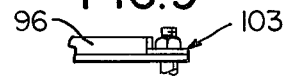
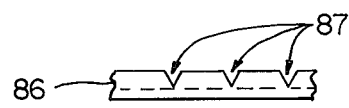
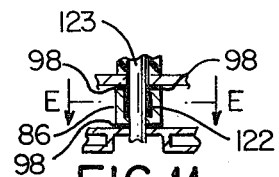
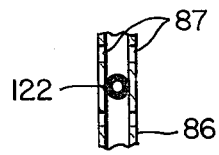
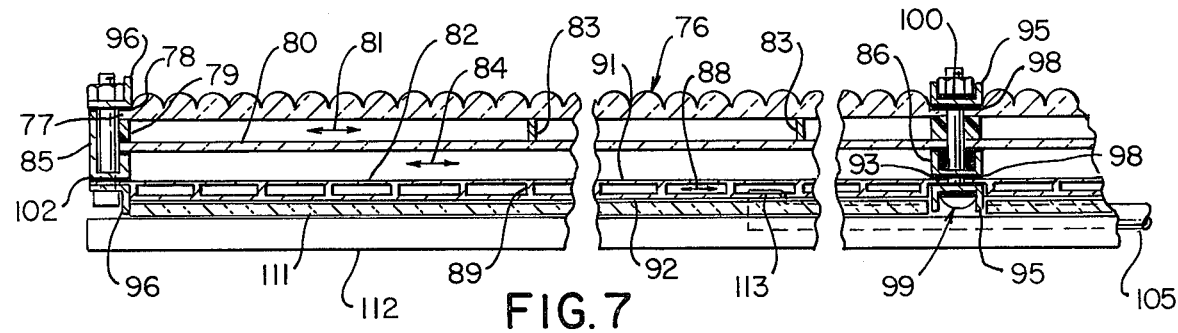
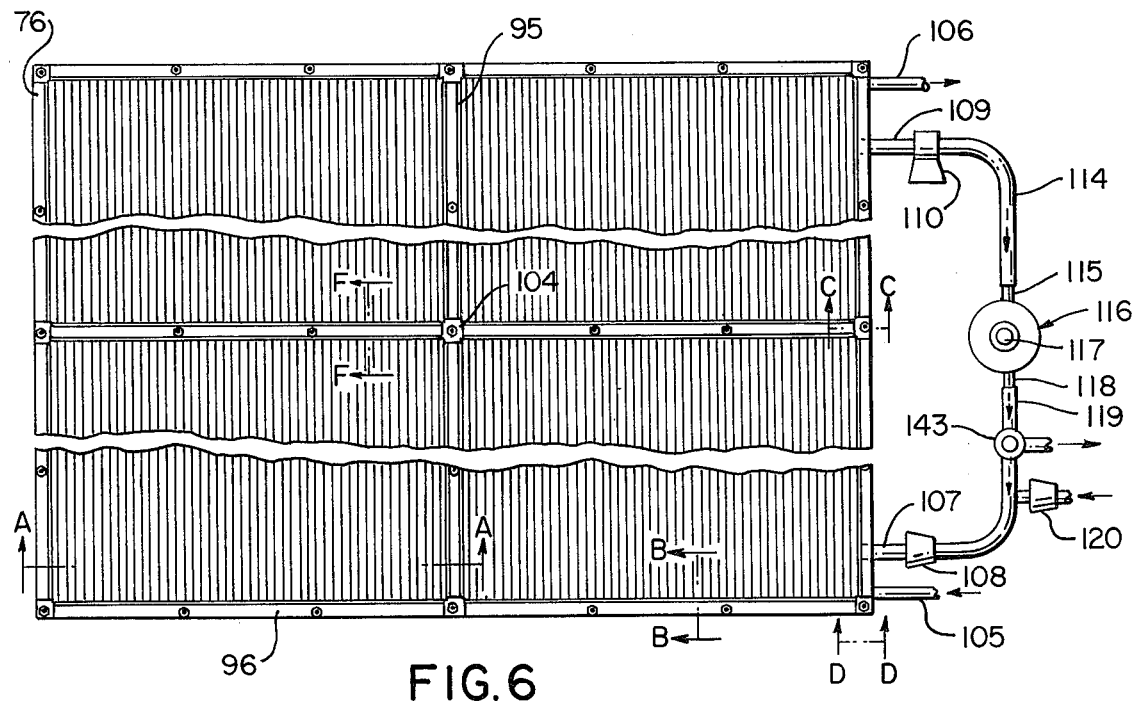

SOLAR ENERGY CONVERSION SYSTEM

This invention relates to solar energy conversion. More specifically, this invention relates to the optimum use of the solar energy available through new and novel improvements in the individual elements of the system, the type of element and the individual relationship of the elements or assemblies in the total energy package.

Over the past years, various efforts have been made to economically and efficiently convert solar energy to individual installation use. The developments for the most part have been fragmented.

In review of the prior art relating to solar energy use, little thought appears to have been given to a coordinated value engineering concept development that would provide optimum use of solar energy at a reasonable cost. In most cases, for example, several heat exchangers have been installed in tanks rather than installing separate coils only in one major tank. This multiple tank use materially increases complexity and cost. Fluid systems have used the same fluid throughout rather than using specific fluids for individual fluid systems, such as using a fluid that will function at low temperatures for only those elements requiring low-temperature protection. Lower cost materials and less expensive system maintenance would be possible through use of these concepts, individual coils selected for specific requirements and easily replaced in the main tank.

It is an object of the present invention to provide an efficient lens type solar energy collector plate.

It is also an object of the present invention to provide a simplified integrated solar system that will collect and utilize, in an efficient manner, a very high degree of the sun's energy impinging on the solar panel area at any time.

It is a further object of the present invention to provide a means for the collection and use of a higher percentage of solar energy impinging on the collection panels through special collection means, special means to use the heat generated in the air section under the insulating panels and special means to utilize a higher percentage of the heat generated in the fluid in the fluid collector panels.

It is yet another object of the present invention to provide for power generation from the temperature differentials in the fluids in the system, with the total system design concept making possible substantially total use of the power generated by the sun as well as providing for energy during substantially longer periods of lack of sun power within buildings.

It is yet another object of the present invention to provide a means for self activation and operation of the system through power generation by air pressure, by air within solar panel chambers, heated by the sun's rays.

Other objectives and advantages of the invention will become apparent in review of the following description.

In accordance with the present invention, a lens-type solar energy collector top plate is provided having an upper surface of a multiplicity of half-round cylindrical lens sections of rod-like configuration, said lens sections arranged in essentially parallel relationship with one another and extending essentially across the total area of the plate.

In a preferred embodiment, the lens-type solar collector panel used has a top surface of half-round cylindrical lens sections of rod-like configuration, said sections extending continuously from one end of the panel to the other, said panel separated from a base plate by non-circulatory air chamber, said base plate overlaying black-faced fluid retaining chambers, and circulating air spaces extending essentially over the entire face of said fluid retaining chambers between the face of the fluid retainer chambers and the bottom of the base plate, from which air is released on a pre-determined, intermittent basis to the air power generation elements.

When installed on a house roof or other suitable substrate, in a plane generally perpendicular to the passage of the sun, and connected to standard solar energy conversion systems, or to the particular system hereinafter described, efficient use of solar energy is achieved.

In general, the basic collector of the system more fully utilizes the available solar energy through insulating cylindrical lens type collector panels separated by air space from essentially conventional fluid retaining absorber panels that are operated on an intermittent basis to provide heated fluid within a predetermined temperature range for desired use as described later herein.

The panels include a separate energy source by inclusion of a simple system of pressurization and circulation of the heated air within the air pocket between the lens type solar collector panels and fluid-filled absorber panels, as described hereinafter.

In a preferred embodiment the heat sumps or heat retaining elements of the system consist basically of two separate containers of fluid maintained in a different heat range. An accessory small domestic hot water heater is also incorporated in the system as described hereinafter.

In addition to the heat sumps, the system includes a hydronic (or radiant) floor heating system with a specially designed dispersion pipe for floor installation as described hereinafter. A special adaption for use of maximum output energy is provided for a Rankin engine style power conversion unit, several of which are currently under production. A water to water heat pump may be installed in lieu of the Rankin engine for an alternate air type solar energy system.

Provisions are also made for two types of air-conditioning to be incorporated in the system, one involving the use of power supplied by the Ranking engine system through conventional air conditioner and the second being an evaporative type system described later herein.

One of the main advantages of the preferred system involves the use of various heat exchanger coils installed within the main or high temperature heat sump activated on demand by a separate control system to provide heat transfer to a separate system and which provide a shunt for by-pass of the heat exchanger by a solenoid operated valve. These systems and the interrelationship is more fully defined in the description section.

The second or lower temperature water tank is of much larger capacity than the high temperature tank with the multiple heat exchanger elements and may serve the dual purpose of a swimming pool as well as heat sump.

In relation to the solar heat collector panel assembly described herein, the assemblies are particularly adaptable to new construction in roof installations but may also be used as a self-contained water heating and solar power generating unit independent of any building if placed at a proper angle with substantial backing to hold the units in an optimum position to collect sunlight directed toward the lens type solar collector plate.

In general, the solar heat collector panel assembly is both a heat generator to heat water, or a low temperature freezing fluid, retained in and pumped through a hollow fluid retainer panel and at the same time heat air and compress the same in a circulating air pressure area directly above and perpendicular to the fluid retainer top panel face (top plate). The compressed air is expelled from the circulating air pressure areas of individual or multiple panel units in intermittent cycles through a special controlled valving arrangement to provide heated air under pressures up to about 30 psig to drive mechanical power converting machines such as air turbines or piston engines and in turn provide electricity through generators if desired. By controlled cycling of the pressure exhaust from various panels in a panel assembly, the panel assembly can be used for home heating and continuous power can be provided for other uses during the working period of the solar power assembly. The hot gases from the power mechanism can also be recirculated to a building structure to provide additional heat to that provided by the fluid heated in the fluid retainer panels.

It is to be noted that the system could be programmed to be self energizing, without outside power controls, by the air pressure generated within the circulating air chambers through solar heat. This would make self contained remote location operation feasible.

In a manner described in more detail hereinafter, it is to be noted that the solar heat collector panel assemblies will provide optimum use of all the heat generated through exposure of the panel assemblies to sunlight.

BRIEF DESCRIPTION OF THE DRAWINGS

FIG. 6 is a plan view of the solar heat collector panel assemblies joined together.

FIG. 7 is a vertical cross-section view A—A, as indicated in FIG. 6, of solar heat collector panels joined together with sections broken away.

FIG. 8 is a vertical cross-section view B—B, as indicated in FIG. 6, showing a typical top and bottom edge installation.

FIG. 8A is a cross-section view F—F, as indicated in FIG. 6, showing a typical interconnection of fluid chambers in adjacent panel assemblies.

FIG. 9 is a vertical cross-section C—C, as indicated in FIG. 6, showing the top of a side installation.

FIG. 10 is a side view D—D, as indicated in FIG. 6 of a corner assembly.

FIG. 11 is a cross-section view showing a typical assembly bolt sealing installation.

FIG. 12 is a cross-section view E—E, as indicated in FIG. 11, showing the bolt sealing method.

FIG. 13 is a side view of a U-shaped spacer showing air transfer openings.

Figure 3:
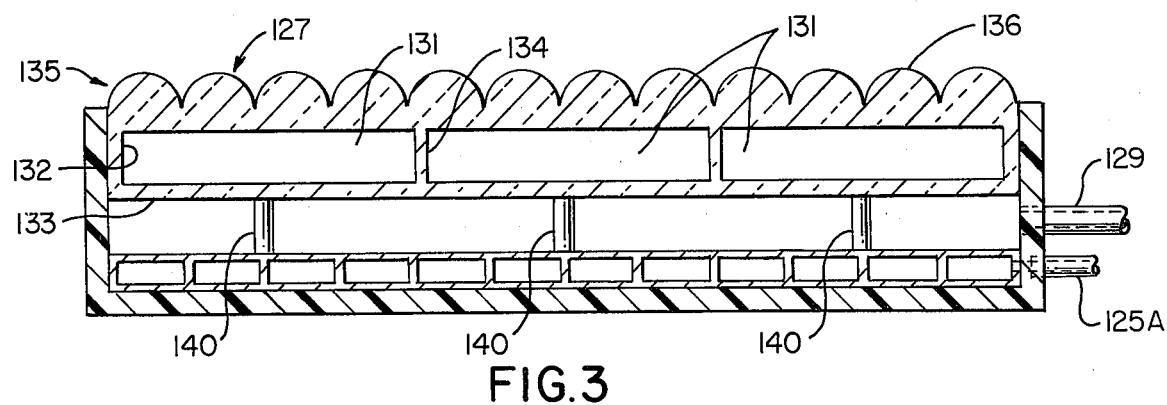
FIG. 3 is a vertical cross-section view G—G, as indicated in FIG. 2, detailing a simplified insulating lens type collector panel and other elements of the panel.
Figure 1:
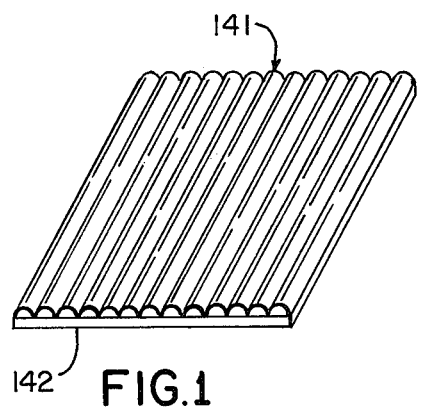
FIG. 1 is an isometric prospective view of a lens type solar collector top plate.

Referring now to the drawings:

In relation to FIG. 1, the top surface 141 consists of solid half round transparent cylindrical lens sections of half rod configuration, said sections extending continuously from one end of the collector plate to the other, said sections part of or backed up by flat transparent plate 142. Preferably, the lens sections and plate would be a unitary extruded or moulded clear plastic or formed glass section. The total plate may be formed in a non planar configuration such as a curve, in lieu of as flat, to provide additional exposure to the sun's rays. In use the plate is tilted, as on a slanted roof top, to maximize collection of the sun's rays at the latitude of installation.

Figure 2:
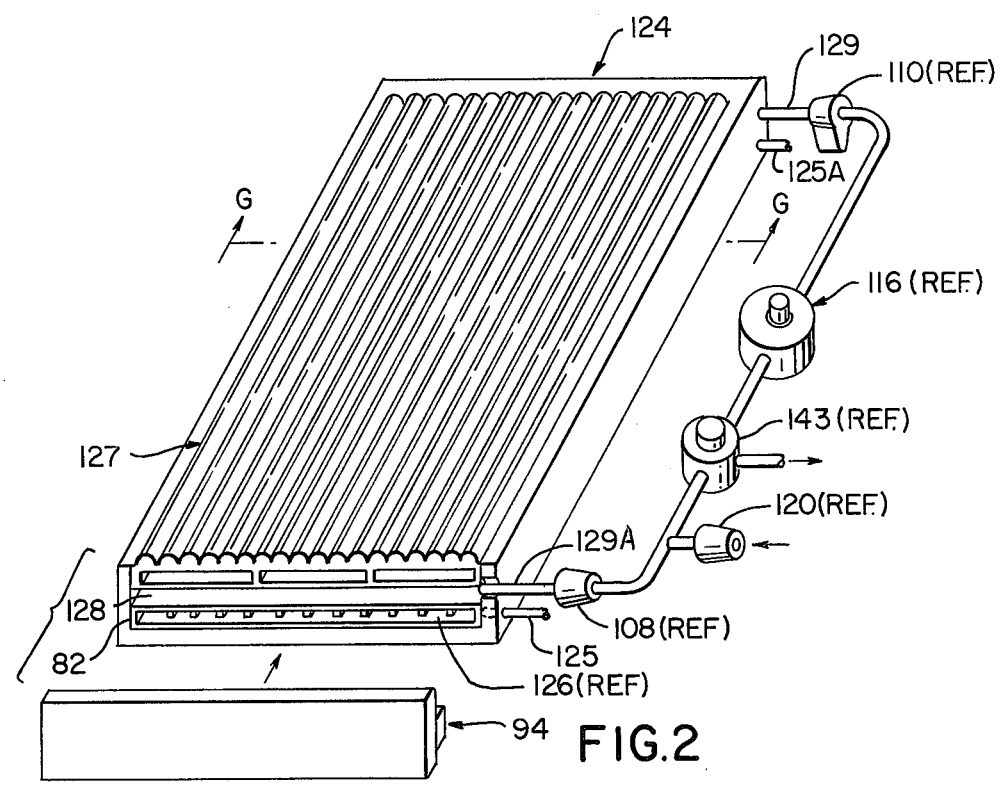
FIG. 2 is an exploded isometric perspective view of a simplified view of a solar panel assembly and air power generation system with the lower shell end removed.

In reference to FIG. 2, an outer box-type shell 124 is formed of insulating material. Basic fluid retainer panels 82 (with lips 93 removed) fits snugly within the box-type shell 124 and fluid inlet and outlet tubes 125 and 125A interconnecting with the header areas 126 (reference 90) are inserted through holes provided in side panels of shell 124 and sealed therein. Especially formed sealed chamber lens type collector panels 127 (reference FIG. 3) are inserted and sealed within the top portion of shell 124 leaving compressable air space 128 between the lens type collector panels 127 and the fluid retainer panels 82. Interconnecting tubes 129 and 129A are inserted in holes bored in the sides of shell 124 to interconnect with the air chamber 128 thus formed. Air power output from the panels as later described herein may then be utilized.

FIG. 3 consists of a lens type collector panel 127 with the top section 135 formed in the shape of adjoining half cylinders 136 extending the length of the panel. Below the cylindrical lens plate and formed integrally therewith are sealed chambers 131 which may be evacuated or filled with a gas with low heat transmission characteristics. End plates 132 and bottom plate 133 and space plate 134 may be formed integral with cylindrical top plate 136 or fabricated separately and joined by adhesive or other means to form the lens plate assembly. Reinforcement elements such as round tie rods 140 may be installed by adhesive or otherwise between the top of the fluid retainer panel and the bottom of the bottom plate in the circulating air space to reduce thickness requirements of the bottom plate to allow for increased air pressure in the circulating air space.

The radius of the cylindrical portions of the top lens section 135, may be varied as desired to provide a focal convergence of the sun's rays at any desired distance below the surface without materially affecting the power transmission of the solar energy. Less power loss in transmittal of the sun's rays through the panel will be encountered with smaller radii, perhaps ¼ inches or less, and consequent less lens thickness. Less material will also be required.

Additional layers of sealed or non-circulating air spaces may be added as desired between the circulating air spaces and the base plate, such additional layers serving to provide additional insulation for higher temperature operation in both the circulating air spaces and the fluid retainer panels.

Figures 4, 5:
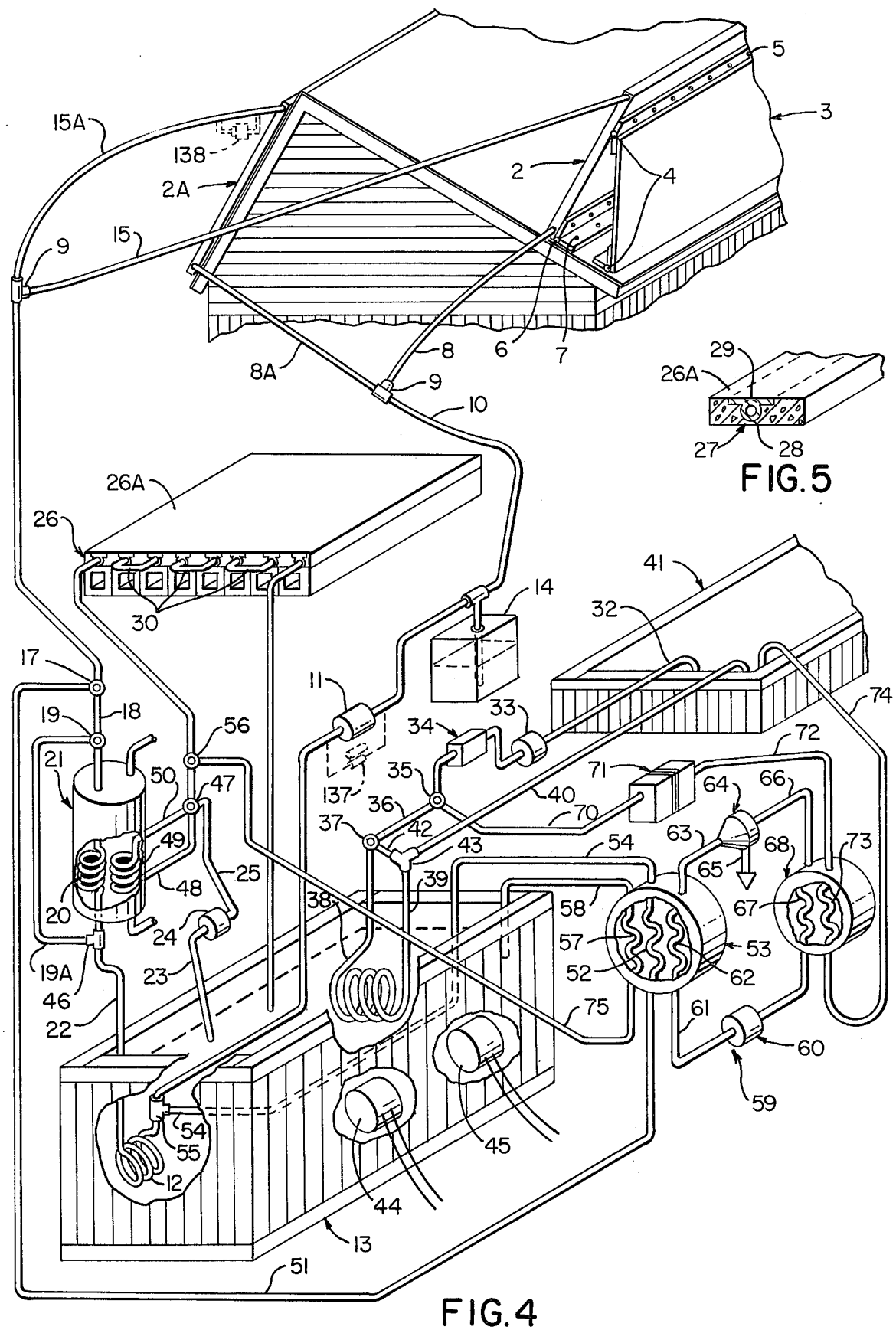
FIG. 4 is an isometric perspective view showing solar panels installed on a house roof, a hydronic or radiant heat floor assembly, a hot fluid sump with cut-aways showing installation of various components, a secondary low temperature heat sump tank or pool, and a solar energy power conversion system.
FIG. 5 is an isometric cross-section view of a top section of the house floor showing special hydronic diffuser tube in position.

Referring again to the drawings, FIG. 4 is an isometric prospective drawing showing the assembly of the complete power conversion system. Toward the top of the drawing are solar panel assemblies 2 and 2A described hereinafter. Panel 2A is shown assembled directly on the roof structure and is applied in this manner, if the roof slope provides for adequate solar impact in the latitude of installation. Solar panel assembly 2 depicts a typical installation when a panel is installed at an angle different to the basic roof structure. In this case, back panel 3 is a rectangular bracing panel that has hinged adapters 4 at the bottom and top of said panel. The lower of which will be attached to the roof by suitable means and the upper of which will be attached to the back of panel 2 by bolts or screws 5 or by other suitable means. A hinge 6 is also attached to the back lower edge of solar panel 2 and screwed or otherwise attached to the roof by screws 7. By this method of attachment, it will be seen that the slope of solar panel 2 may be adjusted to any desired angle by changing the position of either hinge 4 in relation to the adjoining element, the roof top or the back of solar panel 2. Fluid entrance lines 8 and 8A are interconnected at standard commercial pipe type "T" 9 to feeder line 10, which is fed through pumping means 11, which is in turn interconnected to heater exchanger coil 12 located within the fluid retained within tank 13. A makeup tank 14 similar to the commercial standard product used in conventional automotive radiator-type cooling system is interconnected in the system above pump 11.

It will thus be seen that fluid exiting from the heat exchanger coils 12 is pumped by pump 11 into the lower sections of collector systems 2 and 2A. When pump 11 is energized by a conventional thermostatic control (not shown), such as is used on convention electric or gas water heaters, water is pumped up through panels 2 and 2A and exits through upper interconnected solar panel lines 15 and 15A through standard commercial "T" 9 and downwardly through fluid lines 16 through upper interconnected solenoid valve 17 connecting line 18 interconnected solenoid valve 19 and through heat exchanger coil 20 within standard commercial water heater 21 thence downwardly through line 22 and into heat exchanger coil 12 to complete the circuit.

In lieu of pump 11 in the closed collector fluid system, a commercial standard shallow well pump and air tank system 137 may be interconnected in the line replacing pump 11 and a conventional automotive type heat controlled thermostat 138 may be interconnected into the hot fluid exit line 15A adjacent to the top exit from the solar panel. This system may be hooked into a standard house electric circuit in the same manner as used in a shallow well pump system and eliminate this phase of the system from the special control circuitry described later herein.

A hydronic or radiant floor heating system 139 is interconnected with the hot fluid in tank 13. The lower opening of line 23 extends downwardly into the hot fluid of tank 13 and when a standard commercial thermostat indicates a requirement for house heating, pump 24 is energized and draws hot fluid from the tank through line 23 and propels same through line 25, solenoid valves 47 and 56 and line 25A to the hydronic heat tubular system 26 embedded in the top section of the house floor 26A (reference FIG. 5, which is an isometric cross-section view of a floor area with a hydronic tube in place). The hot fluid flows through flange type diffusing tubing 27 (reference FIG. 5) which consists of a conventional tube 28 with an integral top flange 29 attached thereto. Individual tubes are attached at the floor end by flexible connecting tubes 30 and provide a continuous flow-pattern through the floor to be heated. Exit tube 31 carries fluid back to the original source in tank 13.

A rectangular fluid tank 13 is normally full of hot fluid at a predetermined level within which heat exchanger elements, auxiliary heaters, and various fluid lines of the system are immersed as described hereinafter. A top cover (not shown) will normally be provided.

In the secondary low temperature tank 41 or swimming pool previously discussed, as in standard pool circulation systems, line 32 interconnects pool water to pump 33 which circulates pool water through a standard commercial filter chlorinator assembly 34, through solenoid valve 35, line 36, solenoid valve 37 and into heat exchanger coil 38 which is also immersed in tank 13. By the actuation of solenoid valve 37, pool water is pumped through heat exchanger coil 38 and back through line 39, "T" 43, and line 40 to pool 41, to either draw heat from the fluid in tank 13 or add heat to the fluid in tank 13. By actuation of solenoid valve 37, pool water is shunted back to pool 41, through line 42 and line 40 which are interconnected by standard commercial "T" 43.

Auxiliary emersion heaters 44 and 45 are provided in tank 13 and energized as necessary for back-up heating when sufficient heat for satisfactory house temperature cannot be provided by the residual heat in either hot tank 13 or pool 41.

It is to be noted that the normal flow of heated water from the solar assembly is directly through the domestic hot water heater 21. When the high temperature level in this heater is reached, solenoid valve 19 is energized and hot water by-passes the heat exchanger coil 20 within the domestic hot water tank and diverted by valve 19 and flows through interconnecting line 19A, "T" 46, line 22 and into heat exchanger coil 12. If solar panel system is not operational, four-way solenoid valve 47 is actuated and pumps water from the floor heating system through line 48, auxiliary domestic hot water coil 49, out through line 50, and back into the floor water system.

If the water in the domestic water tank is not hot enough at this time, an auxiliary heating coil in the bottom of the domestic water tank (not shown) can be energized to provide the necessary heat requirements until such time as fluid in the tank 13 or solar energy panel system will provide such heat.

A fluid power conversion system for use when other heat requirements of the system have been met and additional solar energy is available, and/or power requirements for other uses such as air-conditioning may be necessary is also shown. As the water temperature differential in tanks 13 and 41 will normally range from 80° to 100° when air-conditioning is required, power may be generated from the system in the following manner. Solenoid operated valve 17 is energized and diverts hot water from the solar panels through line 51, through heat exchanger coil 52 in a freon or similar fluid boiler 53 in the auxiliary power conversion system, thence through line 54 and back to basic solar circuit through interconnected standard commercial plumbing "T" 55. When the basic solar system is not producing, solenoid valve 56 in floor system line 25A is energized and diverts hot fluid from tank 13, through line 75, through auxiliary heat exchanger coil 57 located within freon boiler 53 and back through line 58 to tank 13. Freon circuit 59 consists of a pump 60 with attached pressure line 61 within which fluid is pumped through heat exchanger coil 62 within freon boiler 53, thence through connecting line 63, through expander 64 within which power output 65 generates power through a turbine or piston motor for air-conditioning or other purposes. From the expander 64, freon flows through line 66, through condenser coil 67 within condenser 68 and thence through line 69 to freon pump 60. When the system is energized, solenoid valve 35 is also energized and diverts water from the pool system through line 70, evaporative type water cooler 71, through line 72, through cooling coil 73 within condenser 68 and thence through line 74 back to the pool or tank 41.

In a general discussion of the system, no mention has been made of the electrical control system and heat sensing elements required for operation of the system. It is anticipated that a separate conventional electric power source will be used to activate the solenoid controls. Commercial standard heat sensing devices are available for emersion in the fluids of the various elements of the system to activate (close or open) electric circuits at predetermined fluid temperature. This circuiting would be utilized for the following purposes: (1) to activate flow within the solar collector circuit when fluid in the solar panels has reached a predetermined maximum temperature, and to stop the flow within the circuit when the fluid passing through the panels has reached a predetermined minimum temperature, (2) to activate flow within the hydronic floor heating system when air temperatures within the housing unit reach a predetermined minimum temperature and to deactivate the system when temperature reaches a predetermined maximum temperature as in conventional heating systems, and (3) to allow passage of fluids from the solar panels directly through the heat exchanger coils within the domestic water heaters or to allow passage of fluid from the high temperature heat sink directly through the coils in the domestic hot water heater when a predetermined minimum temperature in the domestic hot water had been reached or to energize a separate heating element within the domestic hot water heater if sufficient heat is not available from either of these sources. The electrical system will deactivate the aforementioned operations in relation to the domestic water heaters when a predetermined maximum temperature has been reached.

Control system will provide for flow of fluid from the solar system directly to the heat exchanger coils in the high temperature heat tank when demands of the domestic water system have been met and will continue to operate until a predetermined high temperature has been reached in the hot temperature tank.

When this temperature, generally about 180° to 200° F, has been reached, the solenoid valve 37 is opened and the water in the pool water circulating system allowed to flow through heat exchanger coils 38 in the hot water tank and back to the pool through line 39, "T" 43 and line 40. This action continues until the water in the pool has reached a predetermined maximum temperature. At this point, solenoid valve 35 is activated and pool water flows through the coils 73 of the condenser of the freon boiler power generating system. At this time, also, solenoid valve 17 is activated and solenoid valve 56 is activated to generate flow through heat exchanger coils 52 and 57 of the freon boiler power section of the freon boiler power system. Pump 60 of the freon boiler power system is then activated and power generation occurs for air-conditioning or other auxiliary use. When the pool water reaches a predetermined high level, the evaporative type water cooler 71 is activated to reduce water temperature in the pool system. When water temperature in lines 51 and 75 reach a predetermined lower temperature, the respective solenoid valves controlling the flow are activated to shut off flow through the respective lines. Heat demands of the floor heating hydronic system will override the requirements of the freon boiler system in the actuation of solenoid valve 56 until heating demands initiated by thermostats in the housing structure are met. When sufficient hot fluid flow is not circulating through the freon boiler to provide the requirements for predetermined power levels, this system is automatically de-energized and solenoid valve 35 is activated to transfer flow from line 70 to line 36.

When the water temperature in the hot water tank 13 reaches a temperature lower than the water temperature in pool 41, solenoid valve 37 is activated and fluid flow generated through heat exchanger coils 38 to transfer heat from the pool water to the fluid in the hot water tank. This heat is in turn transmitted through the hydronic heating system in the floor to provide building heat requirements. When the heat residual from both the pool water 41 and high heat tank 13 is exhausted and the hydronic heating system still requires heat, emersion heaters 44 and 45 are energized to provide sustaining heat from an outside electrical power source. It will thus be seen that a complete heating and cooling system and auxiliary power supply are provided through these novel and original concepts.

It is to be noted that the intermittent air power generating capabilities of individual panels (or of two or more panels with common air pressure generating areas) could be cycled so that the intermittent power generating cycles occur in sequence, with essentially continuous power generated while the solar panels are operational.

FIG. 6 is a plan view depicting the assembly of four solar panel assemblies with the generation of power through air pressure developed by the expansion of air when subjected to solar heat within the panels. Interconnection of the air passages of the four panels is depicted in detail hereinafter. The fluid chambers within the panels are also interconnected by tubing or other means as indicated in FIG. 8A (reference cross-section FF). Fluid input and output from respective lines to the panel chamber assembly is accomplished by transfer openings 113 (FIG. 7) and fluid inlet and outlet lines 105 and 106.

Side overlay plates 97 are flat plates located at the junction of adjacent panels at the edges thereof, with appropriate holes provided therein for bolt and nut assembling and provide the same sealing function when ends of upper and lower U-connector channels 95 (FIG. 7) abut edge compression angles 96 (FIG. 7). Center overlay plate 104 (FIG. 6) is a flat plate with four short sections extending at 90° intervals and with bolt and nut assemblies compresses upper and lower U-connector channels at the center when four solar heat connector panels are joined.

Fluid inlet line 105 (reference FIGS. 6 and 8) extends under and is interconnected to the inside area of all fluid retainer panels 82 to provide cold fluid under pressure to the bottom area of the lower panels in the assembly. Hot fluid outlet line 106 is interconnected at the bottom side to the inner area of fluid retainer panels 82 (reference 113, FIG. 7) (toward the top edge as erected) in a similar manner and provides, on a controlled basis, exit of hot fluid from the panels.

A spring loaded one-way air inlet valve 108 is placed in air inlet line 107 which is in turn connected to sealer air pressure area 84 of solar panel assembly.

Air exhaust line 109 is interconnected near the top edge (as erected) of sealed air pressure area 84. Installed in air exhaust line 109 is a special exhaust air pressure power output valve 110 which is actuated by the pressure level in sealed air pressure area 84 to provide exhaust of hot air through pressure line 114. An adjustable spring loaded "over-center" valve with an adjustable return valve spring is utilized to vary the exhaust air pressure and amount of flow for power requirements. Interconnected with pressure output valve 110 is a pressure line 114 which interconnects with the input opening 115 of commercial standard air turbine 116 having a power output shaft 117 for auxiliary power. The output orifice 118 of air turbine 116 is interconnected with inlet valve 108 by line 119 and auxiliary one-way air inlet valve 120 is interconnected in line 119 to supply auxiliary cool air to the system as required. Interconnected in air line 119 is three-way solenoid operated auxiliary hot air supply valve 143 which may be activated to a bleed off hot air for heating or cooling purposes. In this case all cool air requirements of the collector panel system will be supplied through auxiliary one-way inlet valve 120. Insulation panel 111 (reference FIG. 7) is provided as indicated on the drawing and additional or thicker panels 112 may be provided depending on insulation requirements.

It is to be noted that the solar heat collector panel assembly as described utilizes a very high percentage of sun heat energy as compared to other solar heat collector assemblies. In addition to hot water for heating purposes, hot air from exhaust under pressure may be used to power mechanical devices such as air turbines or piston engines. Circulation of air within the panels eliminates the collection of vapor droplets on the internal collector surfaces and eliminates fogging and loss of heat transmission to the collector panels. After the hot air is used in the auxiliary power system it may be circulated through the building for additional heat or power generation purposes. If air conditioning is required, hot air from the air turbine exhaust may be piped outside the structure in lieu of recirculation through the panels.

It is thus seen that the solar heat collector panel assembly can be used for both heat and power in the winter as well as providing power for air conditioning or other requirements in periods of hot weather when sunlight (and heat) is available. A particular advantage of the lens type solar collector plate 76 is that sun heat will be reflected downward to the fluid retainer panel in the morning and evening hours when the sunlight would be impinging on the panel at a very limited productive angle for heat transfer if a flat upper surface were to be used.

It is further noted that fluid flow may be cycled at different temperatures depending on requirements to provide more or less air expansion and pressure for power use of the solar heat collector panel assembly.

As indicated in FIG. 7, lens type solar collector plate 76 has a top surface of half round cylindrical lens sections extending continuously from one end of the collector plate to the other in a plane generally perpendicular to the sun's rays as directed toward a house roof or other structure on which the panel assemblies are mounted. The lens plate 76 has a continuous lip 77 extending continuously around the edge of the plate on the upper surface. Lens strip seal 78 extends continuously around the lens plate 76 on top of lip 77. Lens plate 76 is flat on the entire bottom surface. Edge spacesealer strip 79 is generally rectangular in cross section and extends continuously around lens plate 76 from transparent base plate 80 to provide an open area 81 between lens plate 76 and flat transparent base plate 80. Transparent base plate 80 is essentially a flat piece of glass or plastic, in the preferred embodiment providing free passage through of the heat elements of sunlight and reflection of any reflected heat elements of sunlight back from the bottom side of the plate towards the fluid retainer panel 82. Edge spacer-sealer strip 79 may be formed (see alternate FIG. 3) integral with 76 and 80 and the space maintained under a vacuum for better insulation. Generally rectangular space strips 83 are provided running continuously through the panel parallel to the cylindrical lens collectors to provide stiffness to the lens collector plate assembly. Circulating air pressure area 84 is provided by the installation of edge spacer 85 and U-spacer 86 which has V-shaped or other air openings 87 (reference FIG. 13) in both vertical sides of the U. These air openings provide air passages interconnecting air pressure areas of adjacent collector panels assemblies as desired. It is to be noted that U-spacer 86 may also be provided without air passages and sealed top and bottom to provide separate air pressure areas of one or more panel units as desired. Fluid retainer panels 82 which may be extruded from plastic or fabricated from metal have a black top surface to absorb heat and have thin wall sections in the top plate to provide minimum resistance to heat transfer to fluid retainer spaces 88. Fluid retainer spaces 88 are generally rectangular in shape and extend continuously from one end of the panel to the other, with exception of a short section 90 (reference FIG. 8) at each end in which tie webs 89 are removed to provide a continuous flow pattern of fluid within each panel (see detailed FIG. 8)

Fluid retainer panel 82 consists of continuous flat top plate 91 which extends in all four directions past lower plate 92 and provides a lip 93 that is retained by sealing assemblies continuously around the perimeter to provide sealed air pressure area 84 between the bottom of transparent base plate 80 and the top of fluid retainer panel 82. The lower plate 92 of fluid retainer panel 82 extends continuously under and parallel to top plate 91 of panel 82 except for the lip 93 and is sealed at the sides by tie webs 89 and at the top and bottom by sealer strips 94 (reference FIG. 8). Sealer strip ends 94 abut the edge tie webs 89 at both sides and are sealed thereto with adhesive, solvent or otherwise. Fluid retainer panel 82 thus provides a fluid area extending continuously under lens solar collector plate 76.

Collector panel assemblies are joined by a group of parts described as follows:

Upper connector channel 95 extends continuously from top to bottom of panel (as erected on a sloped building roof) except for cut-away of side sections at both ends (as shown in FIG. 9) of U-channel end and edge compression angle 96, and center overlay plate 97 (reference FIG. 9). Directly beneath upper connector channel 95 is U-channel strip seal 98 which runs continuously under channel and on top of lips 77 of adjacent lens plates (reference 76). U-spacer 86 is located between the lower face of transparent base plates 80 and the upper lips 93 of fluid retainer panel 82. U-channel strip sealer 98 extends continuously under lips 93 and above lower U-connector channel 95 to provide a continuous seal. Bolt and nut assemblies 99 extend vertically through the connector assembly parts at appropriate intervals to provide continuous sealing around plates. Bolt shank seals 100 are installed under the head of the bolt and under the nut to provide air seals around the bolt shank.

The edges of the panels are sealed by continuous edge sealing system described as follows:

Edge compression angles 96 extend continuously around the edges of the total assembly, except for cutaway sections at joining areas at corners (as shown in FIG. 10) of compression angle end and the corner assembly. Between edge compression angle 96 and lip 77 of lens plate 76, lens strip seal 78 is provided. U-shaped edge spacer 85 has one side of the U shorter than the other and extends continuously around the edge of the total collector plate assembly. Upper edge spacer seal 101 is provided on top of the short side of the continuous U-spacer 85 and edge spacer seal 102 is provided continuously around the bottom of edge spacer 85. Lower edge compression angle 96 extends continuously around the bottom edge of the panel assembly except for joining points at the corners (as shown in FIG. 10) compression angle end and corner assembly and at joining panels (as shown in FIG. 9). As shown in FIGS. 6 and 7, bolt and nut assemblies are spaced at appropriate distances around the assemblies to provide continuous sealing of the individual collector assemblies. Corner overlay plates 103 (reference FIG. 10) consist of flat plates with holes to accept bolt and nut assemblies and when assembled with bolt assemblies provide compressive pressure at the end of the joining angles to seal sealed air pressure area 84.

FIG. 8 is a vertical cross-section B—B depicting a typical edge assembly of the total collector assembly. An enlarged detail of the total collector assembly is described earlier herein.

FIG. 8A as shown in cross-section view depicts the joining of fluid chambers when two panels are joined one above the other as in cross section F—F, FIG. 6. Fluid chambers 90 of abuting panels are interconnected by tubes 121 as necessary to provide a continuous flow upward through the complete panel assembly of fluid as it becomes heated by solar energy input.

FIG. 9 is an enlarged view of a vertical cross section C—C showing the top of a side installation, as described previously herein.

FIG. 10 is a side view D—D of a corner assembly as described earlier herein.

FIG. 11 is an enlarged cross-section view showing a typical seal around a shank of a bolt assembly to prevent air escape. Cylindrical seal 122 consists of a hollow cylinder of flexible material which fits snugly around bolt shank 123 between the lower face of transparent base plate 80 and the upper face of the bottom section of U-channel 86.

FIG. 12 is a cross-section E—E of FIG. 11 showing the cylindrical flexible seal around the bolt shank as installed within the U-channel 86.

FIG. 13 is an enlarged side view of U-channel 86 with cut-outs 87 to allow for transfer of air upwardly and/or horizontally within the panels.

It will be appreciated that the instant specification exemplifies the present invention, and that various modifications and changes may be made without departing from the spirit and scope of the present invention.

What is claimed is:

1. A solar energy conversion system comprising
   a top panel having an upper surface of solid half-round cylindrical lens sections of rod-like configuration, said sections extending continuously from one end of said panel to the other;
   a base plate spaced below said top panel;
   means forming a sealed air chamber between said top panel and said base plate;
   means forming a black-faced fluid circulating chamber below said base plate; and
   means forming an air circulating chamber between said base plate and said fluid circulating chamber and extending substantially over the entire black face of the fluid circulating chamber for passing air there-through.

2. A solar energy collector as defined by claim 1, having means therein to discharge air from the circulating air chamber on an intermittent basis.

3. A solar power conversion system as defined by claim 1 including means to raise fluid to predetermined temperatures within the solar collector panels and to generate flows only between predetermined temperatures.

* * * * *